United States Patent [19]

Malmstrom

[11] Patent Number: 5,771,768

[45] Date of Patent: Jun. 30, 1998

[54] HOLE PUNCH WITH QUICK-CHANGE DIE ASSEMBLY

[76] Inventor: Wayne Malmstrom, 1175 Boeing, Boise, Id. 83705

[21] Appl. No.: 611,301

[22] Filed: Mar. 5, 1996

[51] Int. Cl.$^6$ ............................................. B26F 1/14
[52] U.S. Cl. ............................ 83/571; 83/618; 83/628; 83/687; 83/698.91
[58] Field of Search ............................... 83/698.91, 687, 83/691, 628, 571, 618, 620, 599; 412/9, 11, 16; 234/38, 131

[56] References Cited

U.S. PATENT DOCUMENTS

| | | | |
|---|---|---|---|
| 2,481,883 | 9/1949 | Semler | 83/618 |
| 2,745,492 | 5/1956 | Brook | 83/618 |
| 2,957,380 | 10/1960 | Duncan et al. | 83/571 |
| 3,060,780 | 10/1962 | Stuckens | 83/618 |
| 3,559,522 | 2/1971 | Valente | 83/571 |
| 3,631,753 | 1/1972 | Thomas et al. | 83/399 |
| 3,673,908 | 7/1972 | Smith | 83/698.91 |
| 3,808,933 | 5/1974 | Buan | 83/588 |
| 3,908,498 | 9/1975 | Seaborn | 83/210 |
| 3,945,073 | 3/1976 | Adams | 11/1 |
| 3,948,129 | 4/1976 | Plegat | 83/157 |
| 3,967,336 | 7/1976 | Cutter | 11/1 |
| 3,985,056 | 10/1976 | Oseto | 83/552 |
| 4,000,673 | 1/1977 | Lyon | 83/620 |
| 4,014,232 | 3/1977 | Mauger | 83/618 |
| 4,033,037 | 7/1977 | Cooley | 30/363 |
| 4,044,946 | 8/1977 | Cless et al. | 234/39 |
| 4,079,647 | 3/1978 | Elder et al. | 83/441.1 |
| 4,354,783 | 10/1982 | Szanto | 412/13 |
| 4,434,690 | 3/1984 | Mauer | 83/13 |
| 4,442,743 | 4/1984 | Szanto | 83/372 |
| 4,449,436 | 5/1984 | Semerjian et al. | 83/698.91 |
| 4,480,782 | 11/1984 | Morishima | 234/98 |
| 4,494,432 | 1/1985 | Kogane | 83/559 |
| 4,555,966 | 12/1985 | Klingel | 83/71 |
| 4,574,669 | 3/1986 | Vercillo et al. | 83/399 |
| 4,587,830 | 5/1986 | Mills | 83/698.91 |
| 4,656,907 | 4/1987 | Hymmen | 83/571 |
| 4,688,456 | 8/1987 | Stursberg | 83/368 |
| 4,724,734 | 2/1988 | Hse | 83/549 |
| 4,898,055 | 2/1990 | Neilsen | 83/571 |
| 4,907,481 | 3/1990 | Dvorak et al. | 83/571 |
| 5,027,683 | 7/1991 | Kakimoto | 83/76.6 |
| 5,090,859 | 2/1992 | Nanos et al. | 412/11 |
| 5,143,502 | 9/1992 | Kaufmann et al. | 83/571 |
| 5,163,350 | 11/1992 | Groswith, III et al. | 43/549 |
| 5,183,361 | 2/1993 | Ho | 412/16 |
| 5,211,522 | 5/1993 | Ho | 412/16 |
| 5,291,813 | 3/1994 | Blumenthal et al. | 83/599 |
| 5,386,638 | 2/1995 | Weber | 30/358 |
| 5,429,573 | 7/1995 | Jahnke et al. | 483/1 |

FOREIGN PATENT DOCUMENTS

| | | | |
|---|---|---|---|
| 540828 A1 | 5/1993 | European Pat. Off. | 83/687 |
| 3230312 A1 | 2/1984 | Germany | 83/628 |

*Primary Examiner*—Eugenia Jones
*Assistant Examiner*—Charles Goodman
*Attorney, Agent, or Firm*—Ken J. Pedersen; Barbara S. Pedersen

[57] ABSTRACT

Embodiments of an punch machine are shown and described, each comprising a quick-change die assembly. The die assembly may be quickly installed and removed from the punch machine, without bolting or unbolting of either machine housing or the die assembly itself. The die assembly is slid into the machine through a hole in the machine housing and into a position which mates part of the die assembly with the push-bar. A clamp, with a handle outside the machine, is then pivoted against the die assembly. The push-bar is adapted to be self-supporting without being bolted to the die assembly, keeping the push-bar in place without manual adjustment and alignment. The die assembly preferably includes a die, pin retainer, and punch pins, but does not require additional structure to secure the pins to the retainer or to connect the die and retainer. The die assembly preferably includes a system for consistent referencing between various die assemblies, for reducing the instances in which the paper stop must be adjusted when a die assembly is changed.

9 Claims, 12 Drawing Sheets

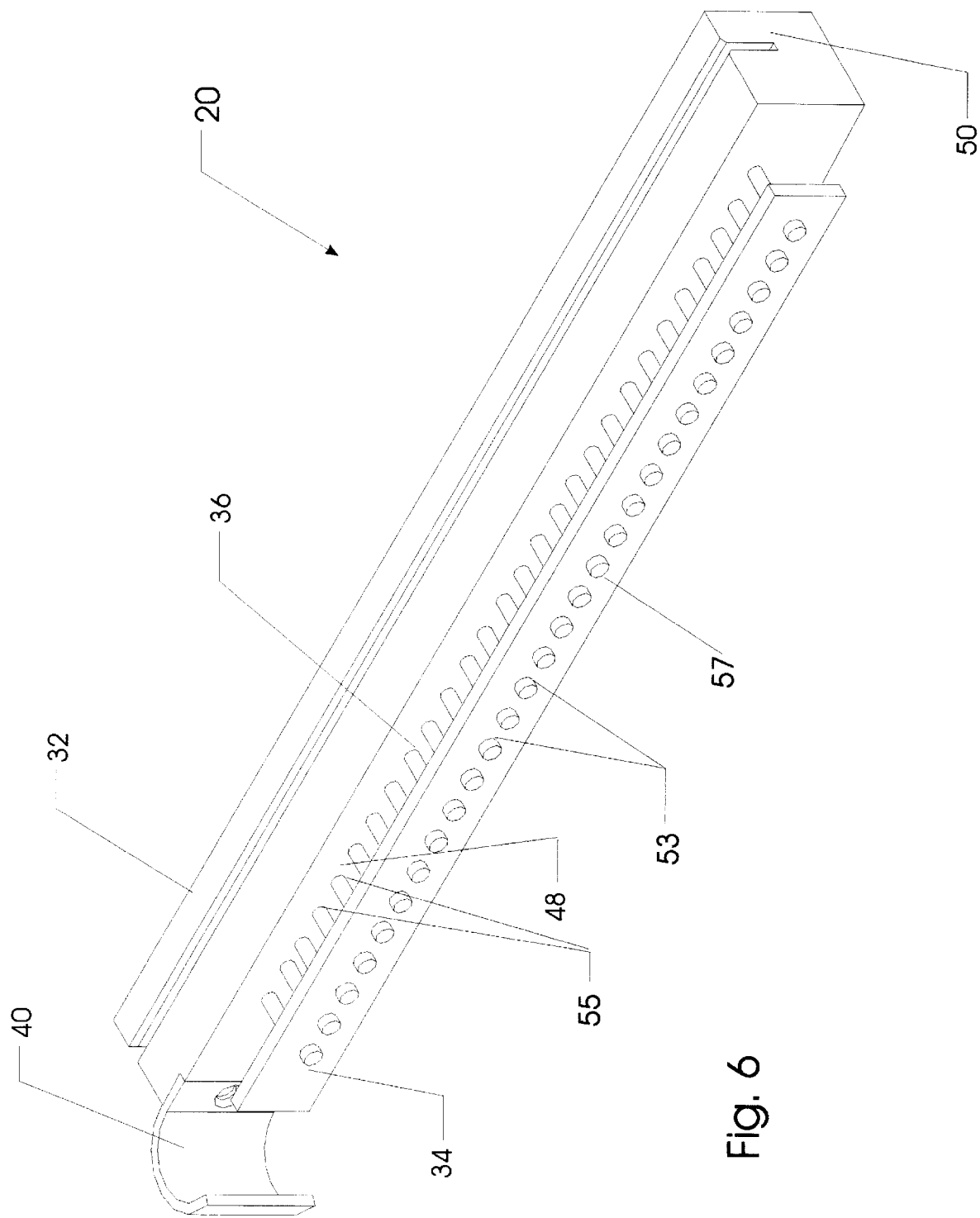

HOLE PUNCH WITH QUICK-CHANGE DIE ASSEMBLY

BACKGROUND OF THE INVENTION

1. Field of the Invention

This invention relates, generally, to automatic paper hole punches, for preparing paper for binding into a spiral notebook, for example. More specifically, this invention relates to a punch machine that has an improved die assembly and mounting means, allowing the die assembly to be quickly installed and removed without bolts, screws or housing panel removal.

2. Related Art

Many automatic punch machines have been built with die assemblies for punching holes through a stack of papers prior to binding. Typically, these die assemblies are bolted into the machine and can be removed for cleaning, replacement or adjustment only by partially disassembling the machine. Bolts, screws, housing panels, and sometimes other machine parts must be removed to remove and replace the die assembly. Although such punch machines can be built to operate effectively and reliably, maintenance of the die assembly is not quick or easy.

One automatic punch with a bolt-in die assembly is the "Versa-Punch™", model VP-6000, made by Performance Design, Inc., of Boise, Id. This punch 100 is shown in FIGS. 1A and 1B. This punch machine includes a die assembly with a plurality of punch pins that are forced generally perpendicularly through the paper near the paper edge. The paper is held vertically with its edge inserted into a slot in the die assembly. The punch pins are then driven across the slot to cut through the paper, creating a hole in each paper at the location of each punch pin.

In order to access the die assembly 102 of the Versa-Punch™ machine, the user must unscrew four screws or bolts 104 to remove a top cover 106 and a front cover 108. Then, to remove the die assembly, four bolts 110 must be removed to detach the die assembly from the machine frame and three more bolts 112 must be removed to detach the assembly 102 from the push-bar 114. To replace the die assembly, the procedure is repeated in reverse, with the user having to hold the die assembly in place to align it with the various bolt holes.

The die assembly 102 shown in FIG. 1B is a square-hole design, which includes a die and a pull-back bar that each have square holes and that are connected by stripper bolts and bushings. This die assembly 102 also includes push-pins and square-end punch pins. The push-pins are pushed into bores in the top of the pull-back bar to engage each punch pin, that is, to secure each punch pin in a position in the pull-back bar that will result in punching of the paper.

Another example of a prior art die assembly that may be used in the bolt-in system is illustrated in FIG. 2. This die assembly 102' typically includes a die 116 with paper slot and die holes, a pull-back bar 118 with holes for receiving a plurality of punch pins 120, and a backup bar 122 screwed onto the pull-back bar for keeping the pins in the pull-back bar. The pull-back bar 118 is connected to the die 116 by means of the stripper bolts. To punch paper, the push-bar 114 drives the pull-back bar 118 forward and backward on bushings on the stripper bolts 126, thus moving the punch pins 120 forward and backward in the die holes 128. The push-bar 114 is supported inside the punch machine 100 only by its attachment to the connecting rods and its being bolted to the die assembly 102.

These die assemblies 102, 102', and the many other typical assemblies made for various binding coils and combs, each has a uniquely sized, spaced and shaped set of holes which typically are centered along about a 14 inch length of the die that is typically centered between the two ends of the die. Therefore, when the user wishes to punch standard 8½×11 inch paper instead of the 14 inch paper, the user must move the paper stop 60 to accommodate the paper and also move the stop each time he/she changes the die assembly. If this adjustment is not made, the punched holes are not centered along the 11 inch paper edge. The holes may be slightly offset to the right or left, and a partial hole may be cut at one or both ends of the paper edge. This results in inferior binding and an unprofessional appearance. For example, as shown with the prior art die assembly 130 of FIG. 7A, the paper stop and left edge of the paper are set at "S" for punching the 14 inch paper. When the same paper stop setting is used for 11 inch paper in this same die 130, the holes in the 11 inch paper are not centered and the far right hole 132 extends to or past the 11 inch paper edge. When maintaining the same paper stop position and switching to another prior art die assembly 134, again the holes are centered within the 14 inch length, but punching 11 inch long paper results in the holes not being centered along the 11 inch length and the far right hole 136 being nearly at the paper edge. To properly punch the 11 inch paper with these two dies 130, 134 requires adjustment of the paper stop to a different position than used for the 14 inch paper and to different positions for the two dies.

SUMMARY OF THE INVENTION

This invention comprises a punch machine and quick-change die assembly for punching holes in paper or other sheets of material. The die assembly is supported and secured inside the punch machine housing by slidable connection with the push-bar and by clamp means that may be easily operated from outside the machine housing. The die assembly need not be bolted to the machine frame or the push-bar and may be quickly removed simply by being unclamped and slid out of the machine housing.

The invented punch machine also comprises an improved push-bar system for driving the die assembly. The push-bar is slidably supported in the punch machine, preferably by bushings in the sideplates of the machine housing. Thus, the push-bar stays in place when the die assembly is removed, so that the die assembly may easily be reinserted without manually moving and aligning the die assembly and push-bar.

The preferred die assembly is simplified in structure compared to conventional die assemblies and comprises a die, pins, and pin retainer. When the die assembly is installed in the punch machine, the die and pin retainer are mounted in the machine housing by the clamp(s) and push-bar slot, respectively, with the punch pins extending from the retainer to the die. The push-bar then moves the pin retainer relative to the die, thus, pushing and pulling the punch pins in and out of the die holes. The die and pin retainer need not be bolted together or connected by any bushings or stripping bolts.

The quick-change die assembly also provides a simplified and quick method of changing or rearranging punch pins. When the die assembly is removed from the machine, one or more punch pins may easily backed out from the pin retainer. Once the die assembly is installed in the punch machine, the pins are held in the pin retainer by the push-bar and preferably without other backing and without bolts.

The die assembly also includes a consistently-referenced system of die hole placement, so that the paper stop need not be adjusted each time a different style die assembly is installed. This system is called herein an "end-justified" system because the 11 inch area at one end of the die has its holes centered within that 11 inch area. This system allows the die assemblies to be more compatible with the preferred paper size, for example, 8½×11 inch paper, so that the paper stop need only be changed for the occasional punching of longer or shorter paper.

BRIEF DESCRIPTION OF THE DRAWINGS

FIG. 6 is an isometric view of the die assembly embodiment of FIG. 3, except fitted with a handle for a left-side entry punch machine.

DESCRIPTION OF THE PREFERRED EMBODIMENTS

Figure 1A:
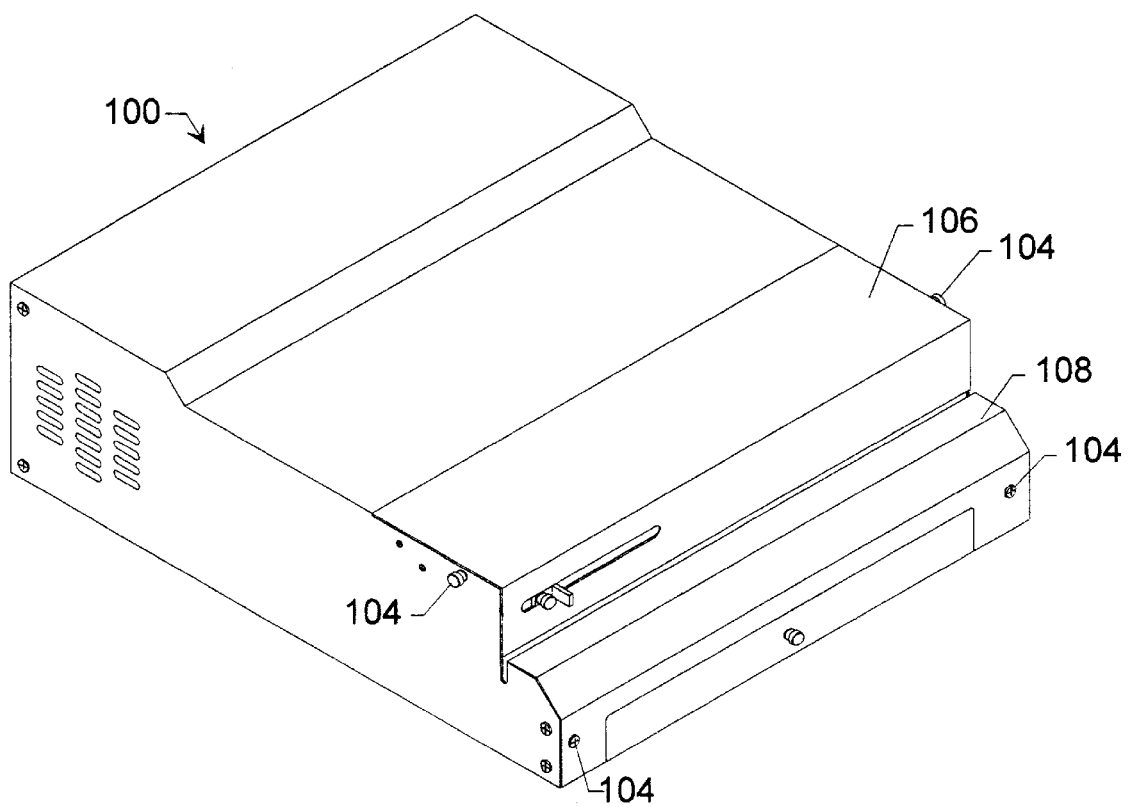
FIG. 1A is an isometric front view showing a prior art automatic punch machine.
Figure 1B:
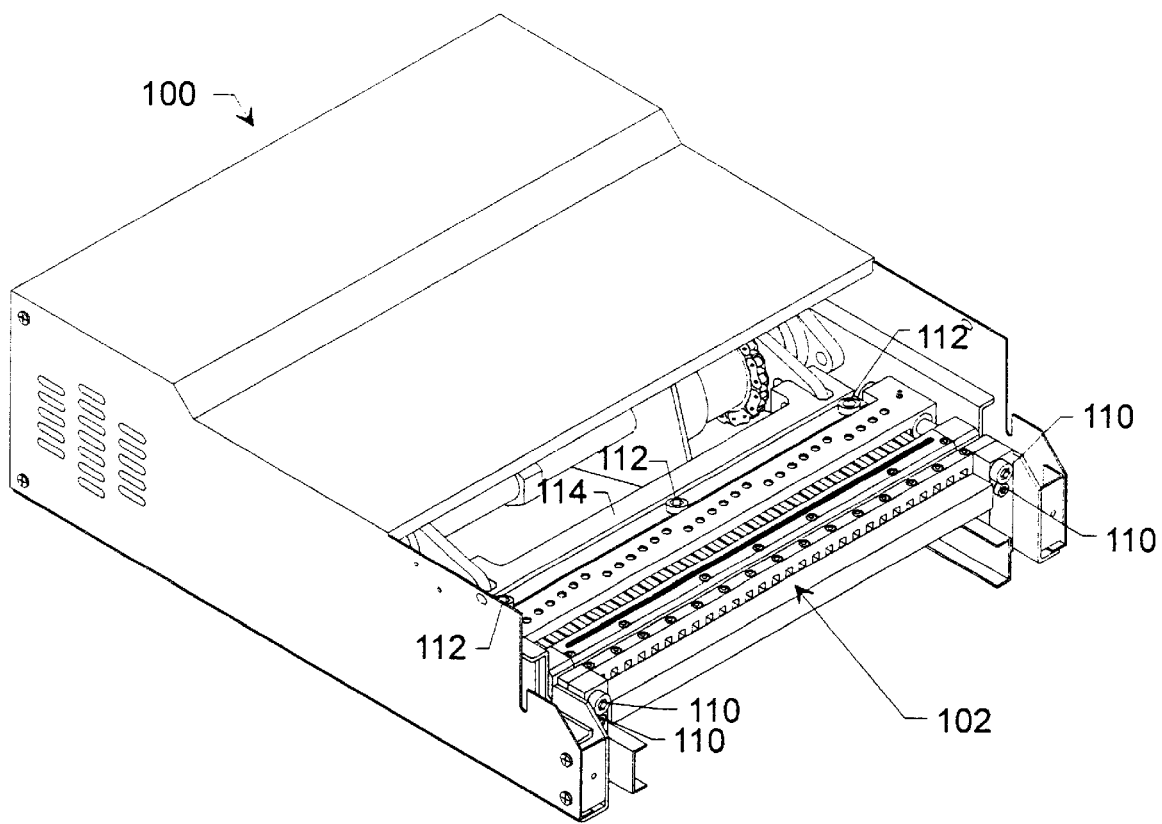
FIG. 1B is an isometric front view of the prior art punch machine of FIG. 1A, with top and front covers removed to reveal the prior art die assembly and its associated bolts.
Figure 2:
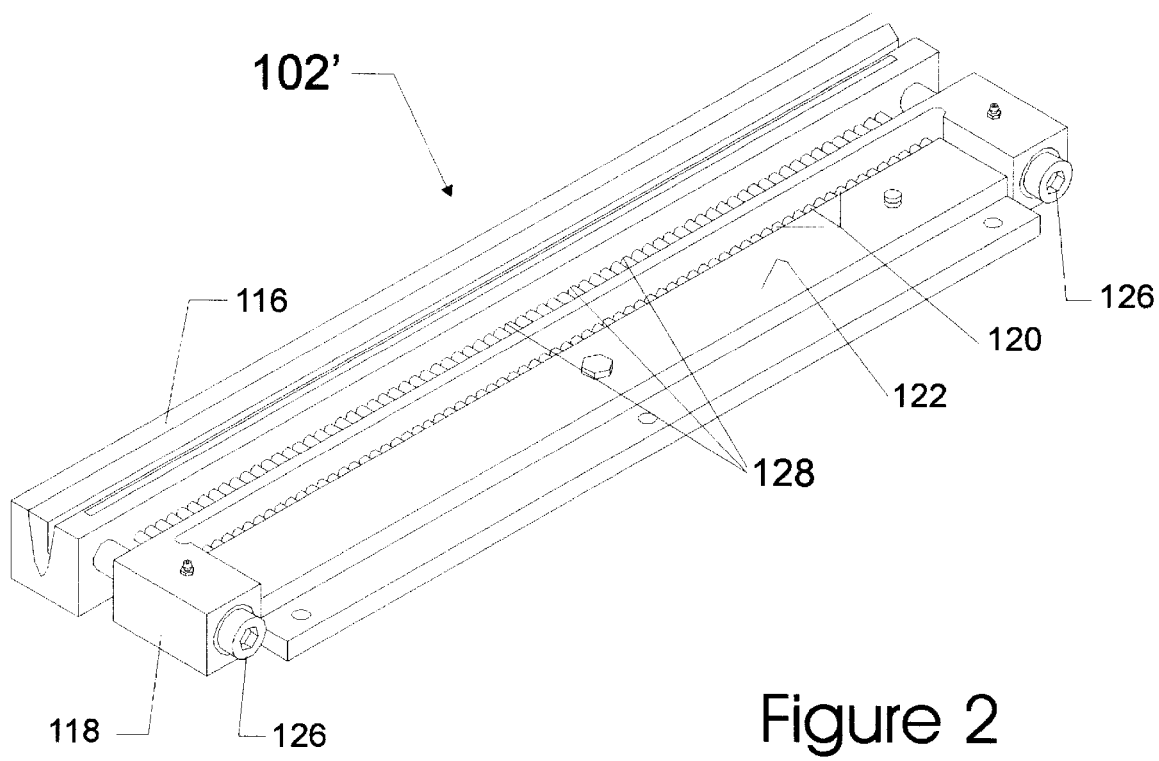
FIG. 2 is an isometric rear view of an alternative prior art die assembly for use with the punch machine of FIGS. 1A and B.
Figure 3:
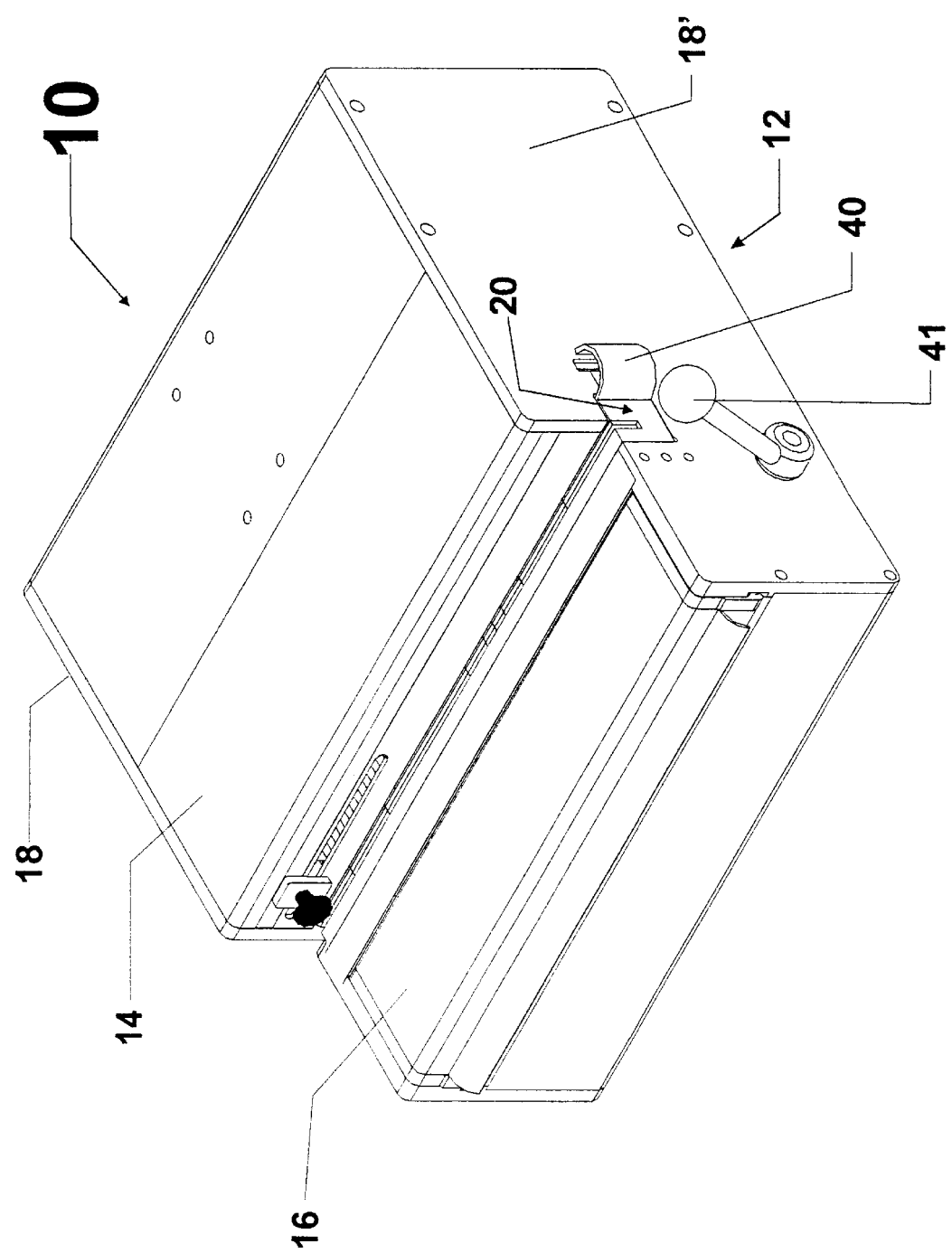
FIG. 3 is an isometric front view of one embodiment of the punch machine invention, with one embodiment of the invented die assembly clamped inside.
Figure 4:
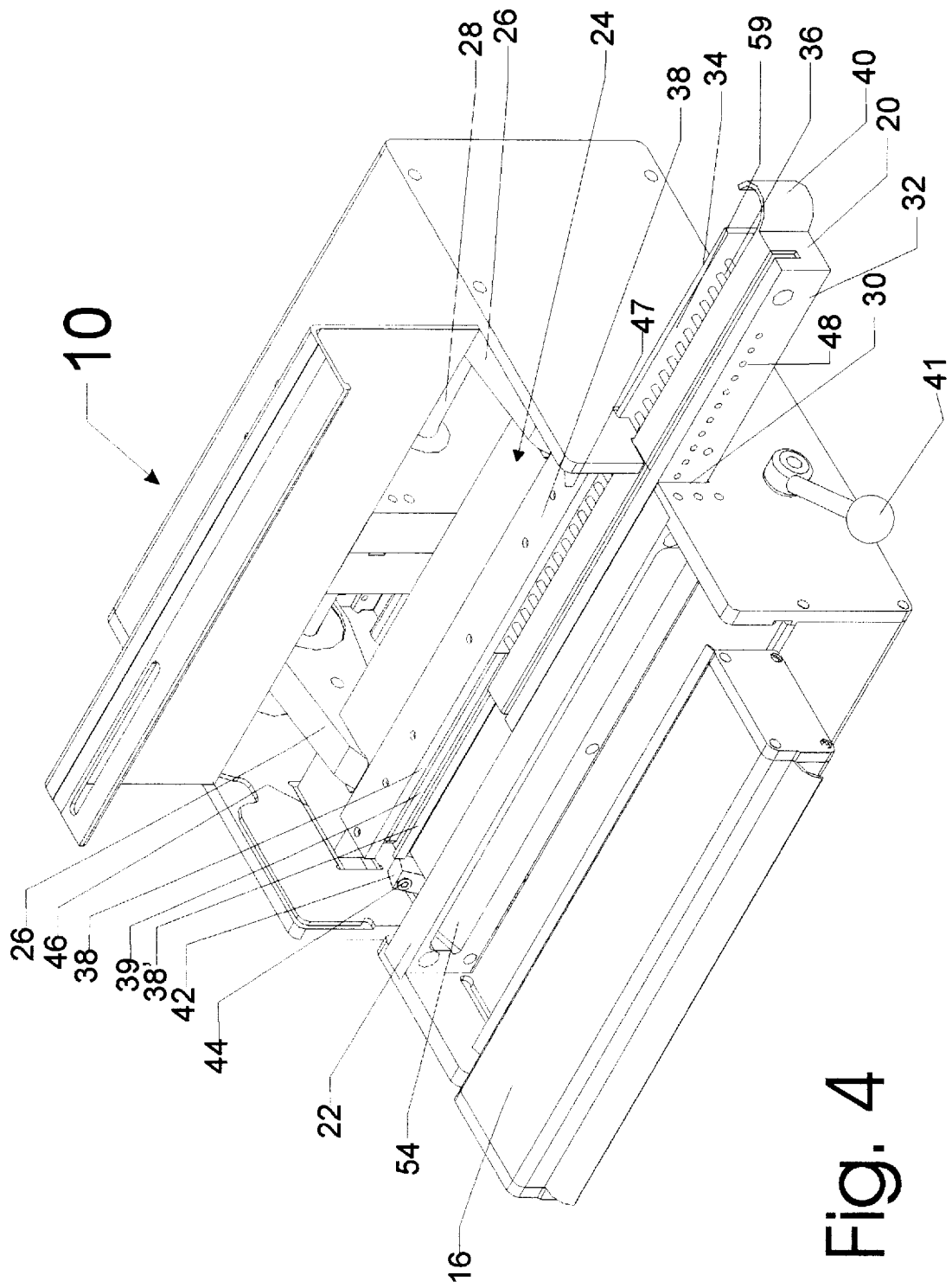
FIG. 4 is an isometric front view of the embodiment of FIG. 3, shown with front drawer pulled forward, top lid opened, and die assembly unclamped and partially removed.

Referring to FIGS. 3–6, there is shown one, but not the only, embodiment of the invented punch machine 10. Punch machine 10 comprises machine housing 12, with hinged top lid 14, front drawer 16 and sidewalls 18, 18'. The housing 12 encloses an interior space for holding the workings of the machine, including the die assembly 20, front cross bar 22, push-bar 24, and the drive system, including connecting rods 26, crankshaft 28, gear box, motor, and wiring. The drive system may be of various designs, such as that used in a conventional bolt-in die machine or others that are well known to those skilled in the field of punch equipment.

Starting the description toward the front of the machine 10, front cross bar 22 extends across the interior space to provide a front support surface for die assembly 20. Die assembly 20 is installed by sliding it through sidewall opening 30 and between cross bar 22 and push-bar 24. During this installation, the die 32 slides along cross bar 22 and the pin retainer 34, holding its punch pins 36, slides along push-bar 24 in between the upper and lower push-bar caps 38, 38'. These push-bar caps 38, 38' act as lips that extend around the top and bottom edges of the pin retainer 34 far enough to form a C-shaped channel or slide, herein called push-bar slot 39, located in the push-bar front surface 35, and having an open end 49. This lipped slot 39 captures the retainer 34 so that it is supported by the push-bar 24 and can be driven forward and backward with linear movement of the push-bar 24.

Preferably, sidewall opening 30 is shaped similarly to the end profile of the die assembly 20 when it is in the non-punching position, in order to guide the die assembly 20 properly into place between cross bar 22 and push-bar 24. Once installed, a die assembly handle 40 extends out of the housing 12.

Figure 5A:
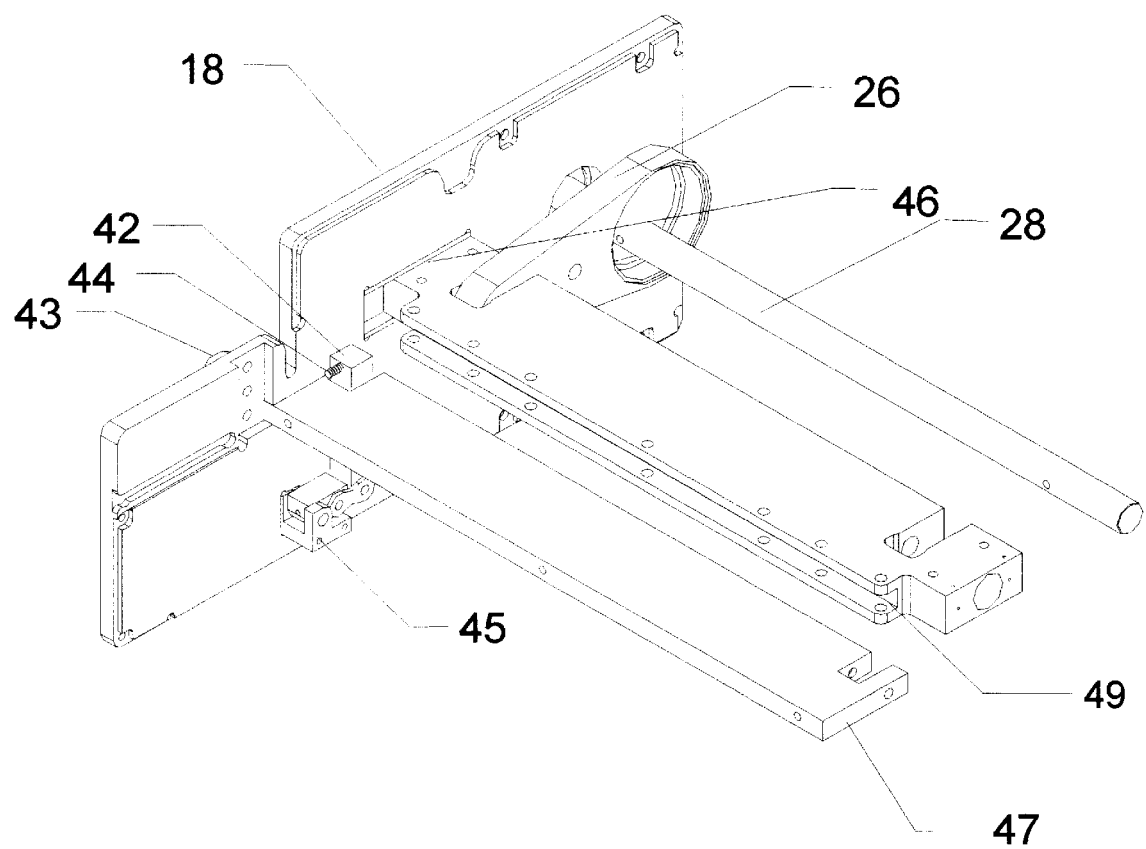
FIG. 5A is an isometric partial view of the embodiment of FIG. 3, without the die assembly and without the push-bar caps, showing the left side clamp assembly in locked position.
Figure 5B:
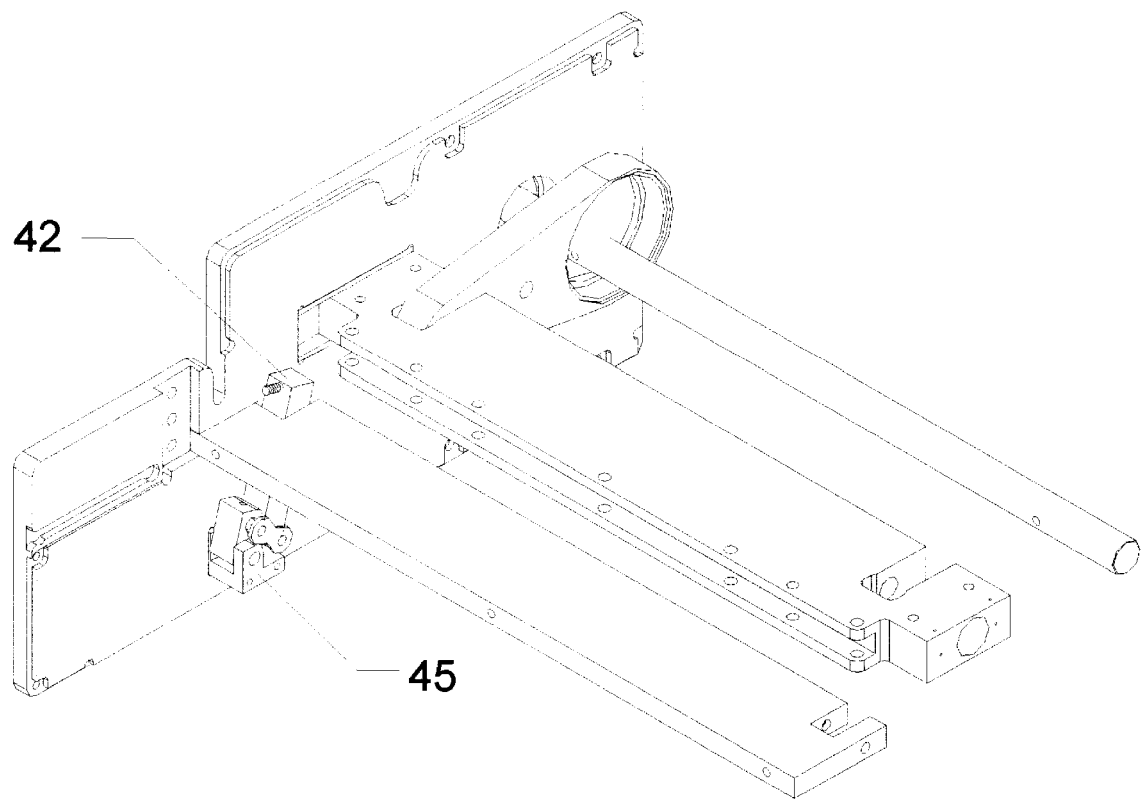
FIG. 5B is an isometric partial view, as in FIG. 5A, showing the left side clamp assembly in unlocked position.

Die assembly 20 is locked in place by a clamp means, preferably mirror image clamp assemblies located on each side of the machine 10. To lock the clamp assemblies, right clamp handle 41 and left clamp handle 43 may be swung up to pivot right clamp pivot bar (not shown) and left pivot bar 42, respectively, toward the back surface of the die 32 to force the die 32 forward against the cross bar 22, which serves as an anchor member. Preferably, the die 32 also rests on top of a die support plate 47. The die 32 is preferably longer than and extends beyond each end of the pin retainer 34, so that the pivot bars can reach the die back surface. The clamped and unclamped positions of a clamp bar 42 and associated linkage 45 are illustrated in FIGS. 5A and 5B.

The clamp assembly pivot bar 42 includes a clamp pin 44 or other protrusion, which presses against the back surface of the die 32 when the clamp assembly is in the locked position. The pressure of the clamp pin 44 against the back surface is great enough to secure the die 32 against the cross bar 22 and to prevent sideways movement of the die 32 and die assembly 20 during use. The die 32 back surface may include a hardened insert or coating to stand up to the force of the clamp pin 44.

Push-bar 24 is supported at its opposing ends by bushings 46 connected to the sidewalls 18, 18'. In use, push-bar 24 slides linearly forward and backward in the bushings 46. When the machine 10 is stopped and the die assembly 20 removed, this support means ensures that the push-bar 24 does not drop down or otherwise move out of the alignment desired for reinsertion of the die assembly 20.

A preferred die assembly 20 is shown in detail in FIG. 6. The die assembly 20 is preferably designed with a minimum of parts, namely, die 32 with die holes 48, punch pins 36, and pin retainer 34. Preferably the die 32 is a generally rectangular bar, having parallel holes 48 or other bores extending through the bar from front to back and perpendicular to the longitudinal axis of the die 32. The die 32 has a generally vertical slot 50 running along the top surface from end to end for receiving edges of paper. The slot 50 extends into the die 32 far enough so that, when the paper edges extend to the bottom of the slot, they extend down past the holes 48. The pins 36 are typically elongated shafts having a first end with a head 53 and a second end 55 adapted to fit smoothly into the corresponding die hole 48, as in conventional die assemblies. The preferred pin retainer 34 is an elongated vertical plate having a plurality of retainer holes 52 bored through it, extending from the retainer 34 back surface 57 to front surface 59 perpendicularly to the retainer 34 longitudinal axis. The punch pins 36 extend through the pin retainer 34 from back to front, so that the pin heads are held in back of the retainer 34 and abut against the pin retainer back surface. The pins 36 then extend into the die holes 48 preferably to an extent that, when the push-bar is moved backward, the pin ends are in the die holes 48 but not across the slot 50, and, when the push-bar is moved forward, the pin ends extend across the slot 50. Alternatively, other die hole and punch pin shapes and configurations may be used, for example, square or rectangular pins.

To install the die assembly 20 in the punch machine 10, the die 32 and retainer 34 are placed together outside the punch machine, with the retainer 34 pulled partly out from the die 32 as it is when the machine is in the off of non-punching position. With the clamp assemblies in the unlocked position and the push-bar 24 resting in the backward position near the back of the bushings 46, the die assembly 20 is then slid into the punch machine, so that the pin retainer slides into the push-bar slot. The clamp assemblies are then locked to secure the die 32 against the cross bar 22, and the die assembly is ready for use.

The punch machine 10 is used, in general, in a way similar to conventional punch machines. A stack of paper is held vertically above the machine 10 with the paper edges in the slot 50. A foot pedal or other actuating means is used to start the machine 10. Crankshaft 28 turns connector rods 26, which translate rotary motion to linear motion of the push-bar 24. The push-bar 24 moves forward in the support bushings 46 and pushes the pin retainer 34 and pins 36 forward. Pins 36 enter the slot 50 and cut through the paper. The pin retainer 34 and pins 36 are then moved backward by the push-bar 24 to remove the pins 36 from the paper and slot 50, so that the paper may be removed from machine 10.

A drawer assembly 16 is preferably included at the front of the machine 20 for catching the paper pieces cut by the die assembly. The paper pieces fall out from the front of the die holes 48, through the slanted interior 54 of the cross bar 22, and into a back opening of the drawer assembly 16. Preferably, the drawer assembly 16 may be pulled out or easily removed for emptying and for gaining access to the machine interior space.

An adjustable paper stop, which is illustrated in FIG. 1A as stop 60, may be included on the punch machine 10 for acting as a limit against which to place the paper. The paper stop preferably comprises a slidable and lockable tab that extends out from a slot in the machine housing several inches above when the paper edges are inserted into the die assembly. In order to reduce the number of times the stop must be adjusted, the die assembly according to this invention preferably also includes a end-justified hole and pin pattern. This means that the holes in each different die assembly, instead of being longitudinally centered on either side of the die transverse centerline and instead of being centered in a 14 inch long area, are instead moved to one side or the other, so that the die holes are near the same transverse reference line near one end of the die. This reference line, then, becomes the preferred location for the paper stop and the paper edge and is positioned in the same place on all die assemblies. Thus, 8½×11 inch paper may be punched in every die assembly made according to this system without the paper stop having to be adjusted. With this system, the holes and pins required to punch the desired pattern in the 8½×11 inch paper are automatically centered properly in the first 11 inches from the reference line. Only when the user wishes to switch to a longer paper, such as 14 inch long paper, or a paper shorter than 11 inches, does the user need to reset the paper stop.

Figure 7A:
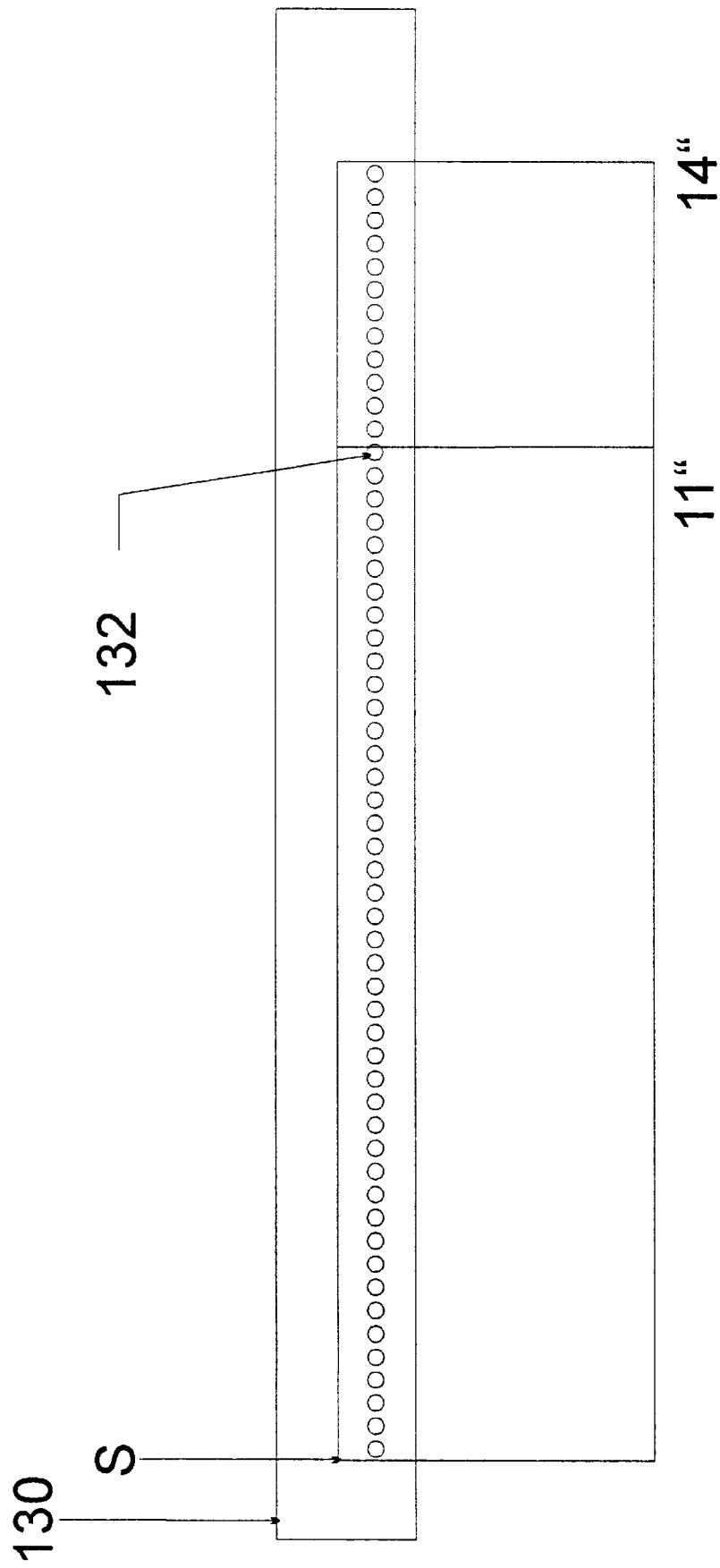
FIGS. 7A and B are schematic front views of two prior art dies, which require paper stop adjustment when changing from 14 inch long paper to 11 inch long paper and when changing dies while punching 11 inch paper.
Figure 7B:
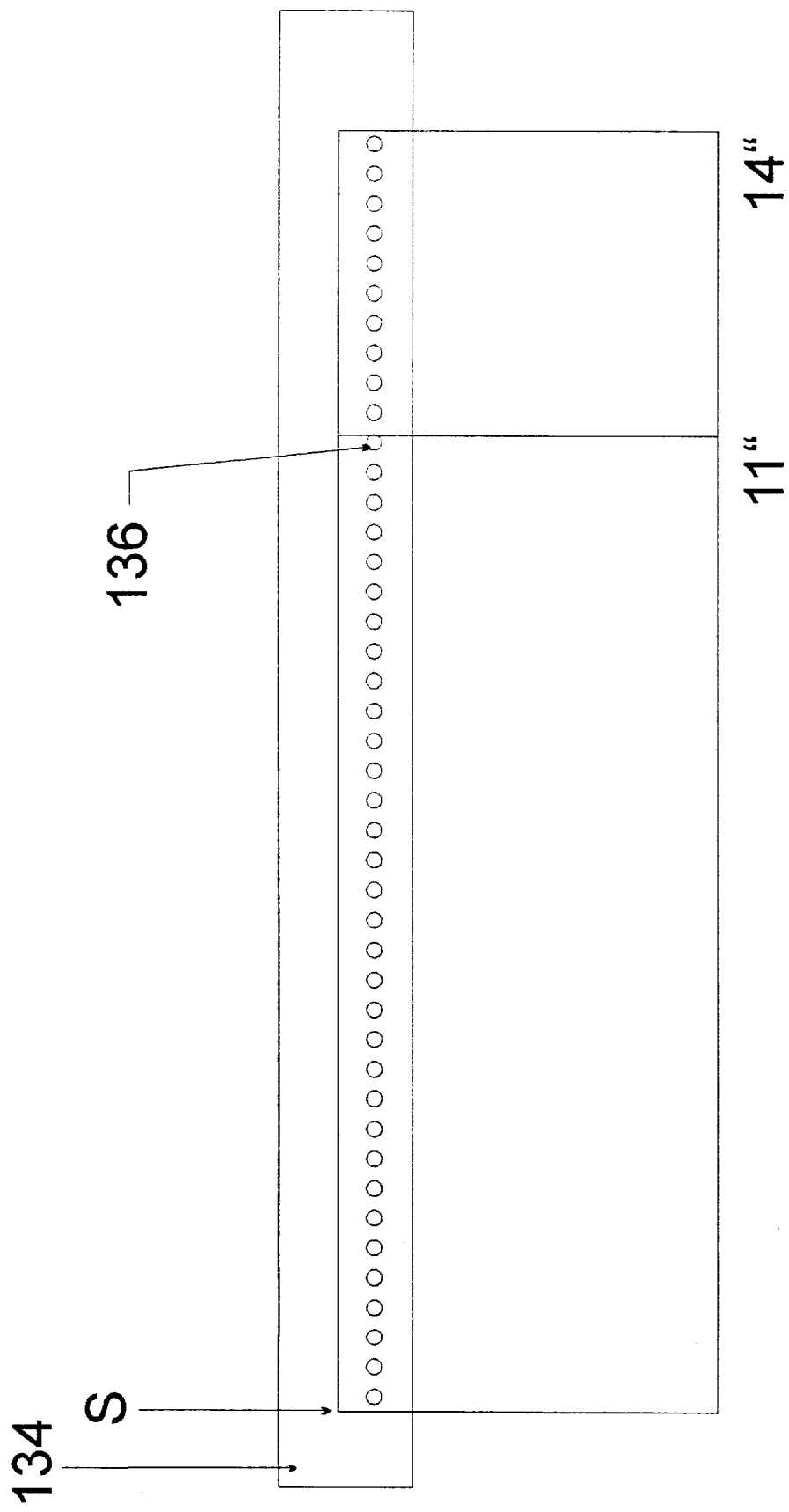
FIGS. 7C and D are schematic front views of two dies according to the invention, which have end-justified hole patterns for 11 inch long paper.
Figure 7C:
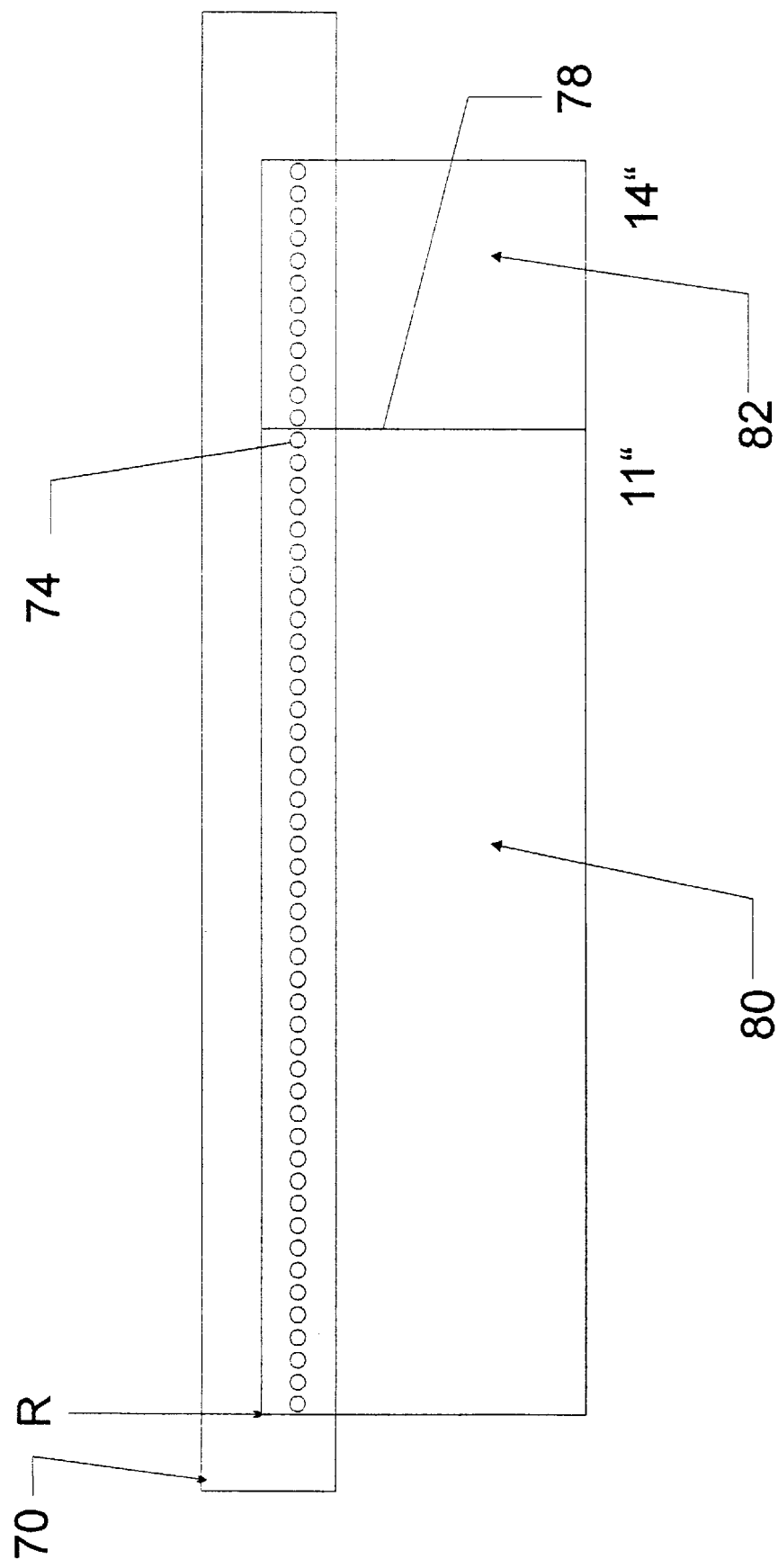
Figure 7D:
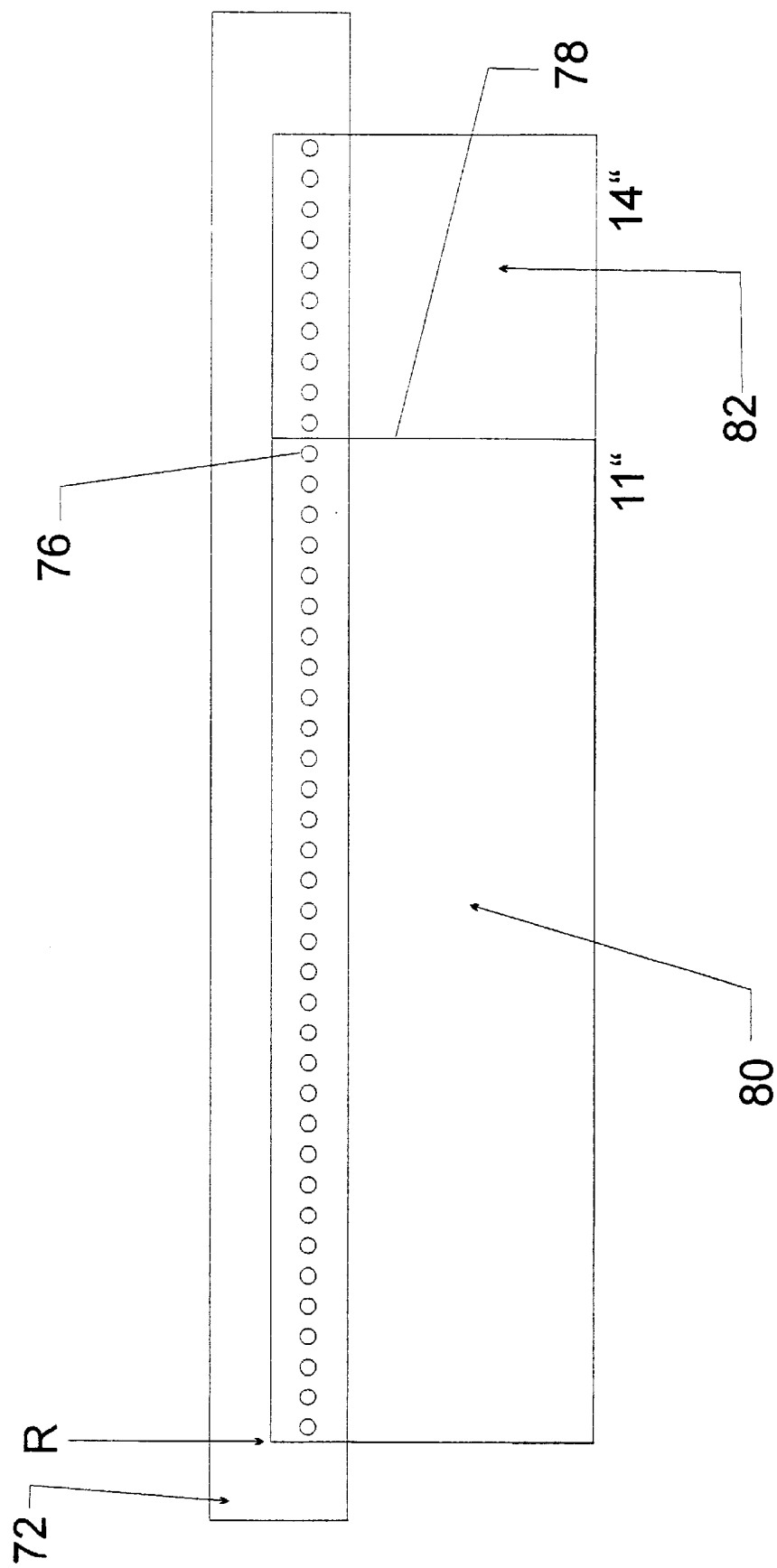

The end-justified system is illustrated in FIGS. 7C and D, by die assemblies 70 and 72. The paper stop and the 8½×11 inch paper edge are placed at the reference line "R" near the left end of the dies 70 and 72. Because the die assembly pins and holes are positioned to be centered in the area covering the first 11 inches to the right of the reference line R, switching dies does not result in off-centered holes or right-edge holes 74, 76 that are at or off of the paper edge 78. Thus, the reference line R forms the left side of a first area 80 in which holes and pins are centered for punching 11 inch paper, and the second area 82 to the right of the first area is additionally used for longer paper. Sometimes the spacing and size of a die's holes will require that a pin be removed at the right edge of the 11 inch paper, but when this is done, the remaining pins in the first area 80 are centered in the area 80. The overall result of this system is a savings of time and paper.

The invented punch machine may be summarized as comprising a die assembly comprising a front portion and a back portion adapted to move relative to each other to cut paper or other sheets placed in the die assembly. The die assembly mounting means comprises a slidable connection between the die assembly back portion and a driving means such as a push bar. The mounting means also comprises a clamp means for holding the die assembly front portion in a stationary forward position while the back portion is moved forward and backward by the driving means. Preferably, the mounting means does not include bolting, screwing, or any other threaded connection of the die assembly onto any part of the punch machine.

Although this description and the claims refer to the punch machine and die assembly being used with paper, the invention is not intended to be limited to only this use. The invented punch machine and the improvements therein may be adapted for punching or cutting other types of sheet material.

Although this invention has been described above with reference to particular means, materials and embodiments, it is to be understood that the invention is not limited to these disclosed particulars, but extends instead to all equivalents within the scope of the following claims.

I claim:

1. A paper punch machine comprising:

a machine housing;

a quick-change die assembly having a front portion and a back portion;

wherein said front portion comprises an elongated die having a longitudinal axis, a slot parallel to the longitudinal axis for receiving paper and a plurality of die holes extending perpendicularly to the longitudinal axis; and wherein said back portion consists of an elongated pin-retainer plate generally parallel to said elongated die and having a front surface, a back surface, and a plurality of retainer holes extending through said plate from the back surface to the front surface and a plurality of punch pins slidably extending through said retainer holes, each punch pin having a first end with a head in back of said plate and abutting said plate back surface and a second end extending from said plate front surface to said elongated die and slidably received in one of said die holes;

an anchor member fixedly connected to the machine housing in a forward position inside the housing;

a means for clamping said die assembly front portion against said anchor member;

a driving means for moving the die assembly back portion toward and away from the die assembly front portion to punch paper received in said die assembly; and a connection means for slidably connecting said back portion to said driving means, said connection means comprising a push-bar connected to said driving means and generally parallel to said back portion, the push-bar having an elongated front surface facing the back portion and a C-channel extending longitudinally along said push-bar front surface and slidably receiving and capturing said pin-retainer plate, wherein the punch pins are retained in the retainer holes by the punch pin heads being held between the pin-retainer plate back surface and the push-bar front surface; and wherein the C-channel has an open end for allowing the pen-retainer plate to be slid longitudinally off of the push-bar;

whereby the die assembly is adapted to be unclamped and slid out of the machine housing.

2. The punch machine of claim 1, wherein the clamping means does not comprise a threaded connection between the die assembly front portion and the anchor member.

3. The punch machine of claim 1, wherein the slidable connection means does not comprise a threaded connection between the die assembly back portion and the push-bar.

4. The punch machine of claim 1, further comprising a plurality of said quick-change die assemblies for interchangeable use in the punch machine for use with a paper stop and for punching a first paper having an 11 inch length, wherein each die assembly die has a first end, second end, and a front surface having a first area with a reference edge near the die first end, the first area having an 11 inch length and having a row of die holes centered within the first area length and having a consistent spacing between the holes;

the die front surface further having a second area adjacent to the first area and near the die second end, the second area having a 3 inch length and a row of holes spaced equally to the first area row of holes, wherein the second area row of holes is located from the first area row of holes a distance equal to the first area hole spacing; and wherein the reference edge and first end of each of said plurality of die assemblies are an equal distance apart;

whereby the paper stop may be maintained in a constant position while punching 11 inch long paper with each of the plurality of die assemblies.

5. The punch machine of claim 1, wherein the punch machine does not comprise means for retaining the punch pins in the retainer holes other than the pin heads being held between the plate back surface and the push-bar front surface.

6. A paper punch machine comprising:

a machine housing;

a quick-change die assembly having a front portion and a back portion;

wherein said front portion comprises an elongated die having a longitudinal axis, a slot parallel to the longitudinal axis for receiving paper and a plurality of die holes extending perpendicularly to the longitudinal axis; and wherein said back portion comprises an elongated pin-retainer plate generally parallel to said elongated die and having a front surface, a back surface, and a plurality of retainer holes extending through said plate from the back surface to the front surface, and a plurality of punch pins slidably extending through said retainer holes, each punch pin having a first end with a head in back of said plate and abutting said plate back surface and a second end extending from said plate front surface to said elongated die and slidably received in one of said die holes;

an anchor member fixedly connected to the machine housing in a forward position inside the housing;

a means for clamping said die assembly front portion against said anchor member;

a driving means for moving the die assembly back portion toward and away from the die assembly front portion to punch paper received in said die assembly; and a connection means for slidably connecting said back portion to said driving means, said connection means comprising a push-bar connected to said driving means and generally parallel to said back portion, the push-bar having an elongated front surface facing the back portion and a C-channel extending longitudinally along said push-bar front surface and slidably receiving and capturing said pin-retainer plate, wherein the punch pins are prevented from sliding out of the pin-retainer plate only by the pin heads being held between the pin-retainer plate back surface and the push-bar front surface; and wherein the C-channel has an open end for allowing the pin-retainer plate to be slid longitudinally off the push-bar;

whereby the die assembly is adapted to be unclamped from the anchor member and slid out of the machine housing.

7. The punch machine of claim 6, wherein the clamping means does not comprise a threaded connection between the die assembly front portion and the anchor member.

8. The punch machine of claim 6, wherein the slidable connection means does not comprise a threaded connection between the die assembly back portion and the push-bar.

9. The punch machine of claim 6, further comprising a plurality of said quick-change die assemblies for interchangeable use in the punch machine for use with a paper stop and for punching a first paper having an 11 inch length, wherein each die assembly die has a first end, second end, and a front surface having a first area with a reference edge near the die first end, the first area having an 11 inch length and having a row of die holes centered within the first area length and having a consistent spacing between the holes;

the die front surface further having a second area adjacent to the first area and near the die second end, the second area having a 3 inch length and a row of holes spaced equally to the first area row of holes, wherein the second area row of holes is located from the first area row of holes a distance equal to the first area hole spacing; and wherein the reference edge and first end of each of said plurality of die assemblies are an equal distance apart;

whereby the paper stop may be maintained in a constant position while punching 11 inch long paper with each of the plurality of die assemblies.

* * * * *